(12) United States Patent
Lu et al.

(10) Patent No.: US 8,440,768 B2
(45) Date of Patent: May 14, 2013

(54) LOW AMIDINE CONTENT POLYVINYLAMINE, COMPOSITIONS CONTAINING SAME AND METHODS

(75) Inventors: Chen Lu, Germantown, TN (US); Jian Tan, Bartlett, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 447 days.

(21) Appl. No.: 12/486,899

(22) Filed: Jun. 18, 2009

(65) Prior Publication Data

US 2009/0314446 A1    Dec. 24, 2009

Related U.S. Application Data

(60) Provisional application No. 61/073,867, filed on Jun. 19, 2008.

(51) Int. Cl.
*D21H 21/10*    (2006.01)
*C08F 16/00*    (2006.01)

(52) U.S. Cl.
USPC ............ 525/328.2; 162/164.4; 524/548; 525/326.7

(58) Field of Classification Search ........ 525/328.2, 525/383, 386, 326.7; 524/548; 162/164.6
See application file for complete search history.

(56) References Cited

U.S. PATENT DOCUMENTS

| | | | |
|---|---|---|---|
| 3,102,064 A | 8/1963 | Wurzburg et al. | |
| 3,821,069 A | 6/1974 | Wurzburg | |
| 3,968,005 A | 7/1976 | Wurzburg | |
| 4,040,900 A | 8/1977 | Mazzarella et al. | |
| 4,421,602 A | 12/1983 | Brunnmueller et al. | |
| 4,753,710 A | 6/1988 | Langley et al. | |
| 4,894,119 A | 1/1990 | Baron, Jr. et al. | |
| 4,913,775 A | 4/1990 | Langley et al. | |
| 4,931,194 A | 6/1990 | Pinschmidt, Jr. et al. | |
| 5,145,559 A | 9/1992 | Auhorn et al. | |
| 5,176,891 A | 1/1993 | Rushmere | |
| 5,324,792 A | 6/1994 | Ford | |
| 5,356,800 A | 10/1994 | Jaquess | |
| 5,436,299 A * | 7/1995 | Ford et al. ............... | 525/370 |
| 5,491,199 A | 2/1996 | Ford et al. | |
| 5,962,555 A | 10/1999 | Glover | |
| 5,969,011 A | 10/1999 | Frölich et al. | |
| 6,159,340 A | 12/2000 | Niessner et al. | |
| 6,273,998 B1 * | 8/2001 | Kuo et al. ............... | 162/168.2 |
| 6,342,381 B1 | 1/2002 | Jaquess | |
| 6,610,209 B1 | 8/2003 | Sommese et al. | |
| 6,869,471 B2 | 3/2005 | Ödberg et al. | |

FOREIGN PATENT DOCUMENTS

| | | |
|---|---|---|
| EP | 0 041 056 A1 | 12/1981 |
| EP | 0 185 068 B1 | 9/1989 |
| WO | WO 99/43780 | 9/1999 |

OTHER PUBLICATIONS

Notification of Transmittal of the International Search Report and the Written Opinion of the International Searching Authority, or the Declaration, International Search Report, and Written Opinion issued in corresponding International Patent Application No. PCT/US2009/047739 dated Sep. 30, 2009 (11 pages).

\* cited by examiner

*Primary Examiner* — Ling Choi
*Assistant Examiner* — Chun-Cheng Wang
(74) *Attorney, Agent, or Firm* — Kilyk & Bowersox, P.L.L.C.

(57) ABSTRACT

Low amidine content poly(N-vinylformamide-co-vinylamine) (PVAm), is described, as well as processes of making and providing same in fresh or aged formats, and the usage of such polymer to increase papermaking retention and drainage rate and enhance paper dry strength, and other applications.

18 Claims, 3 Drawing Sheets

LOW AMIDINE CONTENT POLYVINYLAMINE, COMPOSITIONS CONTAINING SAME AND METHODS

This application claims the benefit under 35 U.S.C. §119 (e) of prior U.S. Provisional Patent Application No. 61/073,867, filed Jun. 19, 2008, which is incorporated in its entirety by reference herein.

BACKGROUND OF THE INVENTION

The present invention relates to low amidine content polyvinylamine in fresh or aged formats, papermaking compositions containing them, and processes for making, providing and using them.

Polyvinylamine (PVAm) has been synthesized indirectly by polymerizing N-vinylformamide (NVF), and hydrolyzing the resulting polymer since the monomer, vinylamine, does not ordinarily exist in a free state, e.g., see Kröner, M., et al., *J. Prakt. Chem* 2000, 342 (2), 115. Research has been carried out to study its applications in various operations, such as papermaking, e.g., see Pelton, R., et al., *Tappi* 2002, 1(10), 21 and Pelton, R., Hong, J. *Tappi* 2002, 1(10), 21, petroleum production, e.g., see U.S. Pat. No. 4,931,194, and waste water treatment, e.g., see U.S. Pat. No. 6,610,209. Industrial interest in PVAm has grown rapidly.

U.S. Pat. No. 4,421,602 describes a linear basic polymer containing 10-90 mole % N-vinylformamide and 10-90 mole % vinylamine and having a Fikentscher K value of from 10 to 200 (measured in 0.5 wt % strength aqueous sodium chloride solution at 25° C.). The polymer is described as being added to a pulp suspension.

U.S. Pat. No. 5,145,559 describes a process for the production of paper, board and cardboard, comprising draining a paper stock containing undesirable substances in the presence of both a fixing agent and a polymeric cationic retention aid other than the fixing agent. The fixing agent is a hydrolyzed homo- and/or copolymer of N-vinylformamide having a degree of hydrolysis of not less than 60%, and the fixing agent is present in an amount of 0.02-2% by weight, based on dry paper stock, and the polymeric cationic retention aid being present in an amount of 0.01-0.2% by weight, based on dry paper stock.

U.S. Pat. No. 6,159,340 describes a process for enhancing the dry strength of paper, paperboard and cardboard, which comprises hydrolyzed polymers of N-vinylformamide obtained by sole polymerization of N-vinylformamide and elimination from the polymers of from 1 to 10.4 mole % of N-vinylformamide to obtain vinylamine.

The hydrolysis reaction of PNVF can be conducted under either acidic or caustic conditions. It has been known that acid hydrolysis will also generate amidine units resulting from the condensation of adjacent vinylamine and N-vinylformamide groups, e.g., see Pinschmidt Jr, R., et al., *Progress in Organic Coatings* 1996, 27, 209. Recently, it also has been reported that amidine formation also occurs during base hydrolysis, e.g., see Witek, E., et al., *Journal of Macromolecular Science, Part A: Pure and Applied Chemistry* 2007, 44, 503.

U.S. Pat. No. 5,324,792 describes that amidine units can be produced by hydrolyzing PNVF at temperatures above 90° C., but below 175° C. in an aqueous medium which contains less than 50 weight percent ammonia or alkylamine as the sole hydrolysis promoting agent.

The present inventors have determined that the effectiveness of vinylamine polymeric materials as a papermaking retention and drainage aid and for other applications still could be significantly improved.

SUMMARY OF THE INVENTION

A feature of the present invention is to provide low amidine vinylamine polymers. Another feature is to provide vinylamine polymers with low amidine content in aged formats. Yet another feature is to provide high performance papermaking sizing compositions containing low amidine content polymers that can provide increased retention, drainage rate, paper dry strength, or any combinations thereof. Processes for making, providing and using the low amidine content polymers or compositions containing them are also features of the present invention.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purposes of the present invention, as embodied and broadly described herein, the present invention, in part, relates to a polymer comprising units of N-vinylformamide, vinyl amine, and the amidine, wherein the polymer has an age of at least 21 days and an amidine content no greater than about 25 mole %. In various embodiments in accordance with the present teachings, an aged polymer with such low amidine content can be provided by control of certain polymer synthesis conditions, such as reaction medium pH and/or reaction temperature, and/or via post-synthesis storage and handling conditions of the polymer, such as storage pH and/or temperature. In various embodiments, the polymer having an age of least 21 days has an amidine content of no greater than about 25 mole %, or from about 0.1 to about 15 mole %, or from about 0.1 to about 12 mole %. In some embodiments, the polymer has a degree of hydrolysis of no more than about 57%, or from about 25% to about 57%, or from about 30% to about 57%.

The present invention also relates to a polymer comprising units of N-vinylformamide, vinyl amine, and the amidine, wherein the amidine content is no greater than about 15 mole % and a degree of hydrolysis of no more than about 57%. The polymer having these properties can be freshly synthesized or aged.

The low amidine content polyvinylamine polymer can have structure (I):

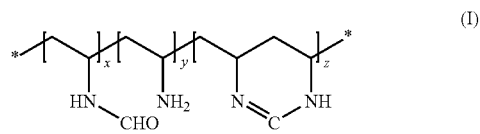

wherein z/(y+z)<90% when x≧y or z/(x+z)<90% when x<y. In some embodiments, x, y and z of the polymer of structure (I) are defined such that x is 50 to 90 mole percent of the polymer, y is 49 to 5 mole percent of the polymer, and z is 0 to 15 mole percent of the polymer. In some embodiments, the polymer is a terpolymer of randomly linked units of N-vinylformamide, vinyl amine, and the amidine.

The present invention further relates to a process for providing the vinylamine polymer having low amidine content, comprising: (a) polymerizing N-vinylformamide, and (b) partially hydrolyzing the poly(N-vinylformamide) formed in step (a) under acidic aqueous conditions at a temperature no greater than about 90° C. and for a period of time of no greater than about 4 hours to provide a polymer comprising units of N-vinylformamide, vinyl amine, and the amidine, wherein the amidine content is no greater than about 15 mole % and the polymer having a degree of hydrolysis of no more than about 57%. In some embodiments, the process further comprises a step (c) comprising maintaining the polymer provided in step (b) under conditions of a pH of no greater than about 6 and/or a temperature of no greater than about 55° C. for at least about 21 days after completing step (b), wherein the amidine content of the polymer being no greater than about 25 mole % after being maintained for 21 days under these conditions. The process can further comprise step (c) comprising maintaining the polymer provided in step (b) under conditions of a pH of no greater than about 3.5 and/or a temperature of no greater than about 30° C. for at least about 30 days after completing step (b), wherein the amidine content of the polymer being no greater than about 12 mole % after being maintained for 30 days under these conditions.

The low amidine content vinylamine polymers in accordance with teachings of the present invention can be used in a variety of applications including, for example, papermaking, textile dye penetration agents, dye fixing agents, flocculants, dewatering agents, crosslinking agents, and other uses.

The present invention also relates to a paper sizing composition comprising at least one vinylamine polymer and at least one polymeric cationic retention aid other than the vinylamine polymer, wherein the vinylamine polymer comprises units of N-vinylformamide, vinyl amine, and the amidine, wherein the amidine content is no greater than about 15 mole % when the polymer is synthesized and no greater than about 25 mole % in the composition. The vinylamine polymer can have an age of at least about 21 days, or at least about 30 days at this controlled amidine content level.

The present invention also relates to a process for making paper comprising adding a polymer to pulp stock before sheet formation to increase at least one paper property selected from retention, drainage rate, or paper dry strength, wherein the polymer comprises units of N-vinylformamide, vinyl amine, and the amidine, wherein the amidine content is no greater than about 15 mole % when the polymer is synthesized and no greater than about 25 mole % when added to the pulp stock. In some embodiments, the low amidine content vinylamine polymer is added to the stock in an amount of from about 0.1 to about 2 pounds per ton dry pulp or more. Other addition amounts can be used. In some embodiments, the polymer is contacted with paper or paper board making pulp in the pulp stock prior to draining to provide a treated pulp suspension, and then the pulp suspension is drained and formed into paper or paperboard. In some embodiments, the treated pulp suspension further comprises a polymeric cationic retention aid other than the polymer. In some embodiments, the treated pulp suspension gives at least about 1% to 50% increase in drainage rate as compared to the same suspension without the polymer, and/or gives at least about 1% to 50% increase in retention as compared to the same suspension without the polymer; and/or gives at least about 1% to 50% increase in tensile index as compared to the same suspension without the polymer.

It is to be understood that both the foregoing general description and the following description of the figures and detailed description are exemplary and explanatory only and are only intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

For purposes herein, "polyvinylamine" or its abbreviation "PVAm" refers to partially hydrolyzed poly-N-vinylformamide (PNVF). Unless otherwise specified, a "polyvinylamine polymer" or "polymer" described herein can be non-aged (i.e., freshly synthesized) or aged. For purposes herein, the term "age" when used in relation to a polymer refers to a time period since the polymer was freshly synthesized. Put another way, it is the period of storage after the polymer was made and before it is used. As used herein, the term "paper" includes all grades of paper and paperboard unless indicated otherwise.

In various embodiments, poly(N-vinylformamide-co-vinylamine) (PVAm) polymers having reduced amidine content in fresh and aged formats are provided, and also the usage of such polymers, for example, in papermaking to increase papermaking retention, drainage rate and/or enhance paper dry strength, and/or in other applications.

Unique methods have been developed in accordance with the present invention for reducing and maintaining low amidine content in polyvinylamine polymers comprising units of N-vinylformamide, vinyl amine, and the amidine. These techniques, generally include, for example, certain methods for controlling hydrolysis temperature, hydrolysis reaction time, polymer storage pH, and/or polymer storage temperature. PVAm polymers which are synthesized and stored in accordance with teachings of the present invention have suppressed or inhibited amidine content. As shown in experiments described in the examples herein, amidine units can adversely affect papermaking retention/drainage and dry strength enhancing performances. By increasing the pulp suspension de-watering rate, such as by using low amidine content vinylamine polymers in accordance with the present teachings, papermakers can speed up the paper machine and improve productivity. Papermakers also can accomplish higher retention and reduce dosages of other wet end chemicals, such as sizing agents and flocculants. Furthermore, since the PVAm products enhance various paper dry strength properties, they can replace many existing dry strength enhancing products, such as starch and glyoxalated polyacrylamide.

Figure 3:
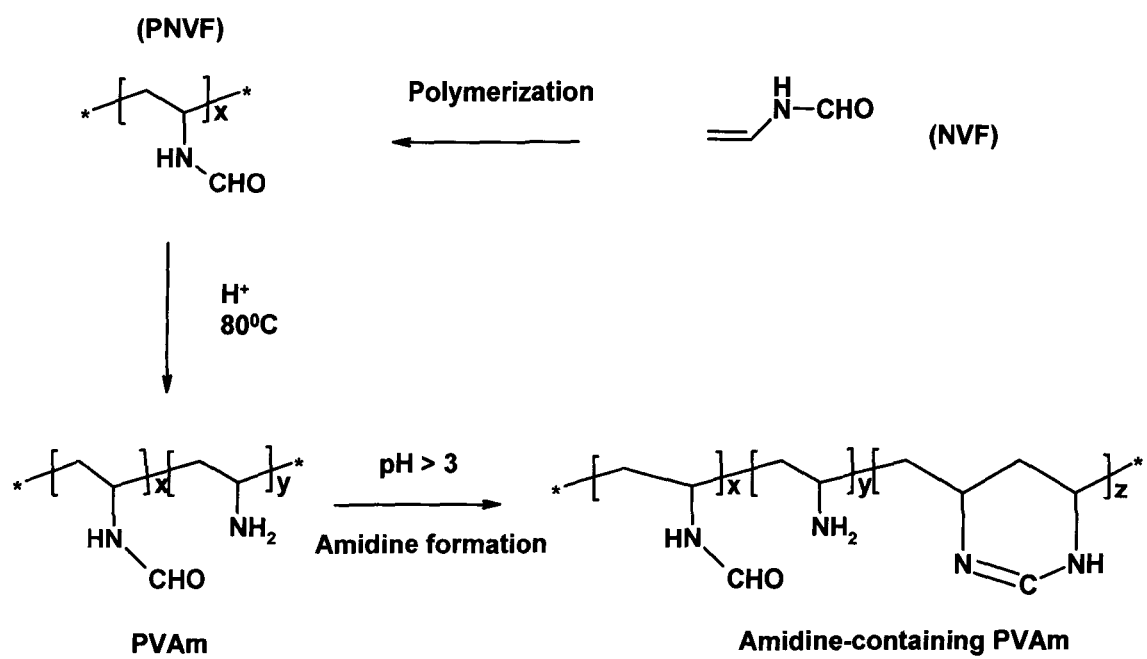
FIG. 3 is a schematic of a vinylamine polymer and amidine unit formation reaction mechanism, wherein formation of the amidine units are suppressed in accordance with embodiments of the present teachings.

The PVAm polymer can be synthesized in a manner such that the amidine content and/or the extent of hydrolysis is controlled, i.e., kept to low levels. As shown in FIG. 3, the synthesis of PVAm can basically be a two-step process comprising homopolymerization of N-vinylformamide (NVF), and the resulting vinylformamide homopolymers are subjected to acid hydrolysis under conditions in which some of the amide groups are converted to amine groups. The formation of the amidine units are suppressed in accordance with embodiments of the present teachings. The homopolymerization of N-vinylformamide can be carried out in conventional manners, such as via methods such as described in U.S. Pat. No. 4,421,602, which teachings are incorporated herein by reference. If an aqueous medium is used, the pH during polymerization can be from 4 to 9, from 5 to 7, from 4 to 6.5, from 7.5 to 9 (e.g., a pH of 4, 5, 6, 7, 8, 9, or any pH between), or other suitable pH for the reaction. Poly-N-vinyl formamide is also commercially available, such as under the product name Lupamin 9000, made by BASF. The molecular weight of the poly-N-vinylformamide polymers can be varied, depending on the polymerization conditions, and can vary over a broad range and still be useful in practicing the invention. The weight average molecular weight of the poly-N-vinylformamide can be, for example, in the range of from about 500 to $10^7$, or from about 25,000 to about $10^6$. Other molecular weights also can be used. The poly-N-vinylformamide typically is a solid that is water soluble or water dispersible.

The poly-N-formamide intermediate is subjected to partial acid hydrolysis to convert a portion of the amide groups to amine groups. The acid hydrolysis can be conducted in the presence of acid at from about 20° C. to about 90° C., or 40° C. to about 85° C., or from about 50° C. to 80° C. As shown in the examples herein, excessive amidine formation can occur if the acid hydrolysis temperature is conducted at higher temperatures. As also shown in the examples herein, high amidine content PVAm polymers are less effective in papermaking applications than polymers of the present invention. In various embodiments, from about 0.05 to 1.5 equivalents (for the purposes of this invention, one equivalent is 1 gram equivalent) of an acid, e.g. hydrochloric acid, hydrobromic acid, phosphoric acid or sulfuric acid, can be used per formyl group equivalent in the poly-N-vinylformamide. The pH of the reaction medium used for acid hydrolysis can be from 0 to about 5, or from 0 to about 4, or from about 1 to about 3, and can be established by addition of an inorganic acid, e.g. hydrochloric acid, sulfuric acid, phosphoric acid or hydrobromic acid, a carboxylic acid, e.g. formic acid, acetic acid or propionic acid, a sulfonic acid, e.g. benzenesulfonic acid or toluene-sulfonic acid, and the like. An aqueous medium is typically used for the reaction medium, although other mediums such as alcohols or inert organic solutions are not excluded. The starting PNVF polymer concentration provided in the acidic reaction mixture can be in a solids content of from 5 to 50% by weight, from 3 to 30% by weight, or from 9 to 15% by weight, or other suitable amounts. The duration of the hydrolysis can generally be less than about 4 hours, or less than about 3 hours, or in a range from about 0.5 to about 2 hours. The acid hydrolysis can be performed without any hydrolysis promoting agent or initiators, although the use of such agents is not excluded. If they are used, conventional ones can be applied. In acid hydrolysis, the formyl group is split off from the poly-N-vinylformamide by an acid in water, and formic acid or a salt of formic acid is obtained as a by-product. The hydrolysis by-product, formic acid, can be removed from the system during and/or after hydrolysis in conventional manners. The extent of hydrolysis depends on the reaction conditions, and can be carried out under atmospheric, reduced, or superatmospheric pressure. The pressure can be controlled to keep the reaction mixture in a fluid state.

The polyvinylamine (PVAm) product polymer obtained can have a degree of hydrolysis of about 57% or less, or about 25% to about 57%, or about 30% to about 57%, or about 20% to 40%. As shown by the examples herein, PVAm products synthesized with an intermediate hydrolysis degree, for example about 30 to about 57% hydrolysis, can produce superior retention/drainage performance, especially when combined with low amidine content management in the vinylamine polymers.

The synthesis of the polyvinylamine can comprise polymerizing N-vinylformamide, and partially hydrolyzing the poly(N-vinylformamide) under acidic aqueous conditions at a temperature no greater than about 90° C. and for a period of time of no greater than about 4 hours to provide a polymer comprising units of N-vinylformamide, vinyl amine, and the amidine, wherein the amidine content is no greater than about 15 mole % and the polymer having a degree of hydrolysis of no more than about 57%.

The PVAm product obtained can be salt-free or essentially salt-free, although polymer products in salt form are not categorically excluded. The PVAm polymer product can be isolated from the reaction solution and worked up in a typical manner for the intended usage thereof, or alternatively the reaction solution containing the PVAm polymer product can be used directly as a retention/drainage aid in papermaking or for other applications.

The freshly synthesized PVAm product can have a low amidine content, such as less than about 15 mole % thereof based on total units of vinylformamide, amine, and amidine in the polymer.

The PVAm polymer can have structure (I):

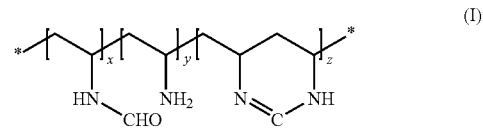

wherein $z/(y+z)<90\%$ when $x \geq y$ or $z/(x+z)<90\%$ when $x<y$. x, y and z of the polymer of structure (I) can be defined such that x is 50 to 90 mole percent (e.g., 55 to 88, 60 to 85, 65 to 80, 70 to 75 mole percent) of the polymer, y is 49 to 5 mole percent (e.g., 45 to 10, 40 to 15, 35 to 20, 30 to 25 mole percent) of the polymer, and z is 0 to 15 mole percent (e.g., 0.1 to 15, 0.5 to 13, 1 to 15, 2 to 10, 5 to 10 mole percent) of the polymer. The PVAm polymer can be a terpolymer of randomly linked units of N-vinylformamide, vinyl amine, and the amidine.

The synthesized PVAm product can be handled and stored until used in an application, such as a papermaking application, under conditions which suppress or inhibit increases in amidine content in the PVAm polymer during aging thereof. The aging PVAm polymer can be maintained with low amidine content by control of certain post-synthesis storage and handling conditions of the polymer, such as storage pH and/or temperature. A polymer having an age of at least about 21 days can have an amidine content of no greater than about 25 mole %, or from about 0.1 to about 25 mole %, or from about 0.1 to about 12 mole % or from about 1 to about 10 mole %. A polymer having an age of at least about 30 days can have an amidine content of no greater than about 25 mole %, or from about 0.1 to about 25 mole %, or from about 0.1 to about 12 mole %, or from about 1 to about 10 mole %.

Increases in the amidine content of the synthesized PVAm polymer can be suppressed or inhibited by storing the polymer under conditions of a pH of no greater than about 6 (e.g., a pH of 6, 5, 4, 3, 2, or 1) and/or a temperature of no greater than about 55° C. (e.g., 55° C. to 20° C., 50° C. to 20° C.) for at least about 21 days after completing synthesis, such that the amidine content of the polymer is no greater than about 25 mole % after being maintained for 21 days under these conditions. The synthesized PVAm polymer can be stored under conditions of a pH of no greater than about 3.5 (e.g., a pH of 3.5, 2.5, 1.5, 1) and/or a temperature of no greater than about 30° C. (e.g., 30° C. to 10° C., 25° C. to 15° C.) for at least about 30 days after synthesis, wherein the amidine content of the polymer can be no greater than about 12 mole % after being maintained for 30 days under these conditions. The amidine content can be of any of the mole % described above in various paragraphs for a polymer maintained for 1 day, 2 days, 3-14 days, 7-14 days, 14-20 days, 21-29 days, 30 or more days, 30-40 days, 30-90 days, 30-120 days, or 60-180 days.

Low amidine content PVAm polymers of the present invention, fresh or aged, can be used in papermaking processes and/or compositions, such as a retention aid component, a drainage aid component, and/or sizing compositions. As shown by the experimental data in the examples herein, PVAm polymer products in accordance with the present teachings can be successfully applied in papermaking industry to provide multiple benefits to papermakers, such as faster drainage, higher retention, and/or greater paper dry strength. For example, the low amidine content PVAm increases pulp suspension de-watering rate, which allows papermakers to speed up the paper machine and thereby improve productivity. Papermakers can also accomplish higher retention and/or reduce dosages of other wet end chemicals, such as sizing agents and flocculants. Furthermore, the low amidine content PVAm products enhance various paper dry strength properties, and can replace many existing dry strength enhancing products, such as starch and glyoxalated polyacrylamide.

The present invention also relates to the use of a combination of microparticles and a PVAm polymer of the present invention as a retention aid system for a papermaking pulp. More than one type of microparticle can be used and more than one type of polymer can be used. Paper and paperboard products made according to the method preferably exhibit excellent opaqueness and/or other desirable physical properties. Sheets of pulp from which the paper and paperboard products are made preferably exhibit excellent drainage and/or excellent retention of pulp fines.

The microparticles can be added in any amount sufficient to improve the retention of fines when the pulp or stock is formed into a wet sheet or web. Preferably, the microparticles are added in an amount of at least about 0.05 pound per ton of paperstock, based on the dried solids weight of both the microparticles and the paperstock, and more preferably in an amount of at least about 0.2 pound per ton of paperstock. Even more preferably, the microparticles are added in an amount of from about 0.3 pound per ton of paperstock to about 5.0 pounds per ton of paperstock, for example, from about 0.3 pound to about 1.0 pound per ton, based on dried solids weight of the paperstock. For purposes of this patent application, the terms "pulp", "stock", and "paperstock" are used interchangeably. The microparticles can be colloidal silica (with or without aluminum or other metal modification), silica gel, alumina, silica sol (with or without aluminum modification), or cationic colloidal alumina. Examples of microparticles include but are not limited to, bentonite, colloidal silica, silicates and/or calcium carbonate. Colloidal silica can be based on silicates, e.g. silica microgel, silica sol, polysilicates, aluminum silicates, borosilicates, polyborosilicates, clay or zeolites. Calcium carbonate can be used, for example, in the form of chalk, milled calcium carbonate or precipitated calcium carbonate. Bentonite can mean sheet silicates which are swellable in water. These are in particular the clay mineral montmorillonite and similar clay minerals, such as nontronite, hectorite, saponite, sauconite, beidellite, allervardite, illite, halloysite, attapulgite and sepiolite. These sheet silicates can be activated prior to their use, i.e. converted into a form swellable in water, by treating the sheet silicates with an aqueous base, such as aqueous solutions of sodium hydroxide, potassium hydroxide, sodium carbonate or potassium carbonate. Depending on type and activation, the bentonite can have a specific surface area of from 60 to 800 m$^2$/g. Typical bentonites are described, for example, in EP-B-0235893. In the papermaking process, bentonite is added to the cellulose suspension typically in the form of an aqueous bentonite slurry. This bentonite slurry may contain up to 10% by weight of bentonite. Usually, the slurries contain about 3-5% by weight of bentonite.

The colloidal silica used may be silicon-based particles, silica microgels, silica sols, aluminum silicates, borosilicates, polyborosilicates and/or zeolites. These can have a specific surface area of 50-1 000 m$^2$/g and an average particle size distribution of 1-250 nm, usually 40-100 nm. The preparation of such components is described, for example, in EP-A-0041056, EP-A-0185068 and U.S. Pat. No. 5,176,891, incorporated by reference herein.

The PVAm polymer can be added to the papermaking pulp before or after addition of the microparticles, though any order of addition can be used. Other polymers can be used in addition to the PVAm polymer of the present invention. Preferably, the additional polymer is a medium to high molecular weight synthetic polymer, for example, a cationic nitrogen-containing polymer such as a cationic polyacrylamide. The polymer can be cationic, nonionic, or amphoteric. If amphoteric, the polymer is preferably used under cationic conditions. At least one other polymer of any kind can be used in addition to the PVAm polymers of the present invention so long as the at least one other polymer does not substantially adversely affect the retention properties of the present invention. The at least one other polymer can be a polyamidoamineglycol (PAAG) polymer. The polymers used in general can have a molecular weight in the range of from about 10,000 to about 25,000,000, and more preferably from about 1,000,000 to about 18,000,000, though other molecular weights are possible.

The additional polymer, if used, can be a high molecular weight linear cationic polymer or a crosslinked polyethylene oxide. Exemplary high molecular weight linear cationic polymers and shear stage processing suitable for use in the pulps and methods of the present invention are described in U.S. Pat. Nos. 4,753,710 and 4,913,775, which are both incorporated herein in their entireties by reference.

The PVAm and/or other polymer(s) can be added before the various shear steps of the papermaking process. The microparticles can be added before and/or after the various shear steps of the papermaking process. The PVAm and/or other polymer can be added before the microparticles and before at least one shear step in the papermaking process. If the PVAm and/or other polymer(s) is added before the microparticles, the microparticles can be added before and/or after a final shear step of the papermaking process. Although it is preferable to add the PVAm and/or other polymer(s) to the papermaking pulp before the last shear point in the papermaking process, the PVAm and/or other polymer can be added after the last shear point.

The papermaking pulps or stocks according to the present invention may further contain a coagulant/flocculant retention system having a different composition than the retention system of the present invention.

The papermaking pulps of the present invention may contain a conventional papermaking pulp-treating enzyme that has cellulytic activity. Preferably, the enzyme composition also exhibits hemicellulytic activity. Suitable enzymes and enzyme-containing compositions include those described in U.S. Pat. No. 5,356,800 to Jaquess, U.S. patent application Ser. No. 09/031,830 filed Feb. 27, 1998, and International Publication No. WO 99/43780, all incorporated herein in their entireties by reference. Other exemplary papermaking pulp-treating enzymes are BUZYME™ 2523 and BUZYME™ 2524, both available from Buckman Laboratories International, Inc., Memphis, Tenn. A cellulytic enzyme composition can contain from about 5% by weight to about 20% by weight enzyme. The enzyme composition can further contain polyethylene glycol, hexylene glycol, polyvinylpyrrolidone, tetrahydrofuryl alcohol, glycerine, water, and/or other conventional enzyme composition additives, as for example, described in U.S. Pat. No. 5,356,800. The enzyme may be added to the pulp in any conventional amount, such as in an amount of from about 0.001% by weight to about 0.100% by weight enzyme based on the dry weight of the pulp, for example, from about 0.005% by weight to about 0.05% by weight.

An enzyme composition can be included in the pulp or stock and can contain at least one polyamide oligomer and at least one enzyme. The polyamide can be present in an effective amount to stabilize the enzyme. Exemplary enzyme compositions containing polyamide oligomers and enzymes are described in International Published Application No. WO 99/43780, which is incorporated herein in its entirety by reference.

If an enzyme composition is included, it can include a combination of two or more different enzymes. The enzyme composition can include, for example, a combination of a lipase and a cellulose, and optionally can include a stabilizing agent. The stabilizing agent may be a polyamide oligomer as described herein.

One particular additive for use according to the methods of the present invention can be a cationic starch. Cationic starch may be added to the pulp or stock of the present invention to form a starch treated pulp. Starch may be added at one or more points along the flow of papermaking pulp through the papermaking apparatus or system of the present invention. If a cationic starch is employed, it can be added to the pulp or combined with the pulp prior to introducing any microparticles to the pulp. The cationic starch can alternatively or additionally be added to the pulp after the pulp is first optionally treated with an enzyme, a coagulant, or both. Cationic starches include, but are not limited to, potato starches, corn starches, and other wet-end starches, or combinations thereof.

Conventional amounts of starch can be added to the pulp. An exemplary amount of starch that can be used according to the present invention is from about 5 to about 25 pounds per ton based on the dried solids weight of the pulp.

A biocide may be added to the pulp in accordance with conventional uses of biocides in papermaking processes. For example, a biocide may be added to the treated pulp in a blend chest after the pulp has been treated with the optional enzyme and polymer. Biocides useful in the papermaking pulps according to the present invention include biocides well known to those skilled in the art, for example, biocides available from Buckman Laboratories International, Inc., Memphis, Tenn., such as BUSAN™ biocides.

The pulps or stocks of the present invention may be treated with one or more other components, including polymers such as anionic and non-ionic polymers, clays, other fillers, dyes, pigments, defoamers, pH adjusting agents such as alum, microbiocides, and other conventional papermaking or processing additives. These additives can be added before, during, or after introduction of the microparticles. Preferably, the microparticles are added after most, if not all, other additives and components are added to the pulp. Thus, the microparticles can be added to the papermaking pulp after the optional addition of enzymes, coagulants, flocculants, fillers, and/or other conventional and non-conventional papermaking additives.

The addition of the retention system in accordance with the present invention can be practiced on most, if not all, conventional papermaking machines.

As stated, drainage of paper stocks with benefit of the vinylamine polymers of the present invention can be carried out at any practical location in a paper making mill, including, for example, the wet end. For example, the polymer can be introduced to a stock mixture at and/or before the head box of the fourdrinier where it is spread onto the moving "wire" or screen. The vinylamine polymer can be used in combination with one or more cationic retention aids. The vinylamine polymer, optional cationic retention aid, and any other optional additives can be added in any particular order, including sequentially or simultaneously together or separately to paper stock before drainage is performed. What is important is that drainage of the paper stock takes place in the presence of the vinylamine polymer. The paper stocks that can be dewatered in the presence of vinyl amine polymer according to embodiments of the present invention are not particularly limited, and can include those prepared using all fiber qualities, either alone or as a mixture with one another. The paper stock is prepared in practice using water, which can be partially or completely recycled from the paper machine. It can be either treated or untreated white water or a mixture of such water qualities. Suitable fibers for the production of the pulps are all conventional grades, for example mechanical pulp, bleached and unbleached chemical pulp and paper stocks obtained from all annuals. Mechanical pulp includes, for example, groundwood, thermomechanical pulp (TMP), chemothermochemical pulp (CTMP), groundwood pulp produced by pressurized grinding, semi-chemical pulp, high-yield chemical pulp and refiner mechanical pulp (RMP). Examples of suitable chemical pulps are sulfate, sulfite and soda pulps. The unbleached chemical pulps, which are also referred to as unbleached kraft pulp, can be particularly used. Pulps also can be produced using waste paper, either alone or as a mixture with other fibers.

The present invention further relates to a process for the production of paper and cardboard by draining pulps, with sheet formation and drying of the sheets, wherein the PVAm polymer of the present invention can be added prior to sheet formation, such as but not limited to, prior to draining the pulp and the like. The PVAm polymer can be added prior to and/or after a shearing stage, and/or prior to and/or after the final shearing stage.

The PVAm polymer can be added as part of a formulation, or as part of a series of additions. For instance, the polymer can be a component in a sizing formulation such as an ASA or AKD sizing formulation, where the polymer is used in part or in its entirety as the cationic polymer component that is typically present in a sizing formulation, for instance as described in U.S. Pat. Nos. 6,869,471; 5,969,011; 3,102,064; 3,821,069; 3,968,005; 4,040,900; and 5,962,555, incorporated in their entirety by reference herein.

In general, for various papermaking processes and/or stages thereof, the PVAm polymer can be added in combination with other components as a mixture, as a series of separate additions, or in any other order of addition. For instance, the PVAm polymer of the present invention can be added to pulp prior to, at the same time as, or after the addition of one or more flocculating agents (e.g., silica, bentonite, clay, or any mixture thereof), and/or can be added to pulp prior to, at the same time as, or after the addition of one or more other cationic polymers (e.g., water soluble) which are different from the polymer of the present invention, such as polyethyleneimines, polyamines, polycyandiamide, formaldehyde condensates and polymers of diallyldimethylammonium chloride, dialkylaminoalkyl (meth)acrylates and dialkylaminoalkyl(meth)acrylamides, or cationic polyacrylamides.

The addition of any one or more of these components can occur before, during, and/or after a shearing stage. Where it is desirable to introduce a high molecular weight polymer and a low molecular weight polymer during papermaking, the PVAm polymer of the present invention can serve as either or both, by making the appropriate MW in the PVAm. As described previously, the polymer of the present invention can be a high MW or low MW depending on reactants used and the amount of polymerization occurring in the formation of the polymer of the present invention. A low MW can be 500,000 molar mass or less (e.g., 500 to 500,000 molar mass). A high MW can be above 500,000 molar mass, such as 550,000 to 1 million or from 1 million to over 4 million.

Before and/or after the addition of the PVAm polymer of the present invention and/or additional polymers, can occur the fiber suspension can be subjected to a shearing stage, for example in a pulper, refiner, wire or screen. Before, during, and/or after shearing, a flocculating agent, like bentonite, colloidal silica or clay or other microparticle can be added. The draining of the pulp with sheet formation on a wire and drying of the sheets can be carried out.

The present invention can be used to make all paper grades and cardboard, for example papers for newsprint, i.e. medium writing and printing papers, natural gravure papers and also lightweight coating papers, can be produced according to the novel process. For example, groundwood, thermomechanical pulp (TMP), chemothermomechanical pulp (CTMP), pressure groundwood (PGW) and sulfite and sulfate pulp can be used. Chemical pulp and mechanical pulp are also suitable as raw materials for the production of the pulps. These pulps are therefore processed to paper especially in the integrated mills, in more or less moist form, directly without prior thickening or drying. Pulps containing interfering substances can also be directly processed. In the novel process, both filler-free and filler-containing paper can be produced. The filler content of paper may be up to a maximum of 40, preferably from 5 to 25% by weight. Suitable fillers are, for example, clay, kaolin, natural and precipitated chalk, titanium dioxide, talc, calcium sulfate, barium sulfate, alumina, satin white or mixtures of the stated fillers.

Sizing compositions in accordance with the present teachings may be used as an internal and/or surface sizing composition for paper and paperboard. The sizing compositions may be added at the wet end and/or used to treat a surface of fibrous sheet. Also, the type of sizing agent that may be used at the wet end may be different from the sizing composition used as a surface sizing composition, or vice versa. When used as an internal size, the sizing composition may be added before the paper sheet forming step in a papermaking process. The sizing composition may be added, for example, to the pulp while the latter is in the headbox, beater, hydropulper or stock chest, and so forth. The sizing composition may be added as far back in a papermaking process as the thick stock. The sizing composition can be added just before the head box of a paper machine. As is known in the art, a sizing composition should be added in such a way to insure proper distribution on the fibers. To insure proper distribution, a sizing composition can be commonly diluted to about 0.1-2% solids, then added before the screens or fan pump just prior to the pulp slurry entering the head box. This dilution, followed by dispersion by the screens and/or fan pump aids in distributing the sizing composition to achieve uniform distribution on the paper fibers. The sizing composition may be used for internal sizing applications at a PVAm polymer dosage (pounds polymer per ton of dry paper solids) that is at least about 0.1, particularly from about 1 to about 15, and more particularly from about 2 to about 8 or from 2 to 4 or from 6 to 8 pounds. Other amounts can be used.

As an option in a process of papermaking, a cationic retention aid(s) can be added to the pulp before, after, and/or at the same time as addition of the PVAm polymer. Examples of cationic retention aids include, but are not limited to, cationic starches and cationic polyacrylamide polymers, for example, copolymers of an acrylamide with a cationic monomer, wherein the cationic monomer may be in a neutralized or quatemized form. Nitrogen-containing cationic polymers can be used. The cationic retention aid can have a low molecular weight. Exemplary cationic monomers can be copolymerized with acrylamide to form cationic polymers useful according to the present teachings. The cationic monomers can include amino alkyl esters of acrylic or methacrylic acid, and diallylamines in either neutralized or quatemized form. Exemplary cationic monomers and cationic polyacrylamide polymers are described, for example, in U.S. Pat. No. 4,894,119, which is incorporated herein in its entirety by reference. The cationic retention aid can be added in an amount effective to improve the drainage or retention of the pulp compared to the same pulp but having no cationic polymer present. The cationic retention aid can be added in an amount of at least about 0.05 pound per ton of pulp based on the dried solids weight of the pulp, and preferably in an amount of from about 0.1 to 2 pounds per ton of pulp. Other amounts can be used.

For internal additive applications, in addition to the polymer and any cationic retention aid, one or more conventional additives may also be included in the composition per se to enhance or tailor performance attributes of the formulation. These optional additives of the composition, for example, can be pH-adjusters, levelling agents, lubricants, defoamers, wetting agents, optical brighteners, pigment, latex binder, pigment-dispersing agents, cross-linkers, water retention aids, coagulants, viscosity modifiers or thickeners, or preservatives, or any combinations thereof.

The pH of the sizing composition can be adjusted to a neutral or acidic pH condition prior to use, such as to a defined level of from about 4 to about 7. Other pHs can be used. Adjustment of pH of the composition is most commonly accomplished through the addition of either acid, sodium hydroxide or ammonium hydroxide (aqueous ammonia). In keeping with the understandings of the present teachings, prolonged storage of the sizing composition, once formulated, at neutral to basic pH is undesired as it can lead to increases in amidine content on the PVAm polymer.

A pulp suspension treated with the low amidine content PVAm polymers according to the present teachings, in the co-presence of a conventional cationic retention aid, can provide about 1% to 50% increase in drainage rate as compared to the same suspension without the polymer, and/or can provide from about 1% to 50% increase in retention as compared to the same suspension without the polymer; and/or can provide from about 1% to 50% increase in tensile index as compared to the same suspension without the polymer.

For surface treatment applications, the coating composition may further include conventional paper coating additives. For example, the coating composition may include a binder in addition to the PVAm polymer. For purposes herein, "coated paper" refers to paper which has a coating applied to its surface, wherein the coating material may comprise the inventive composition, clay, casein, bentonite, and/or talc, etc., applied such as by means of roller, spray, or brush applicators, and the like. The coating can include conventional brightening agents, opacifying agents, etc. Typically, when the paper product is paper, the paper product will have a basis weight of from about 30 g/m$^2$ to about 200 g/m$^2$. When the paper product is paperboard, the paper product will typically have a basis weight of from about 200 g/m$^2$ to about 600 g/m$^2$. Paper products having other basis weights can be used.

Generally, the coating can be applied to one or more sides of the paper product by any means known in the art. For example, paper coating methods include, but are not limited to, roll applicator and metering with roll, rod, blade, bar, air knife; pond applicator and metering with roll, rod, blade, bar, or air knife; fountain applicator and metering roll with roll, rod, blade, bar, or air knife; pre-metered films or patterns, such as gate roll, three-roll, anilox, gravure, film press, curtain, spray; and foam application. In one suitable embodiment, the paper product is fed through a rolling nip in which one of the rolls has been previously coated with the inventive composition formulation. The coating formulation is transferred to the paper product's surface. The excess coating formulation is removed from the surface of the paper product using a steel trailing blade which creates a level coating profile on the surface of the sheet of the desired final add-on coating weight. The resulting coated paper product produced has an improved water/ink holdout and strength as compared to an uncoated paper product. The coating formulation can be used at a dosage (pounds PVAm polymer per ton of dry paper solids) that is at least about 0.1, particularly from about 1 to about 10, and more particularly from about 2 to about 8 or from 2 to 4 or from 6 to 8. Other amounts can be used.

The present invention will be further clarified by the following examples, which are intended to be purely exemplary of the present invention, in which parts are proportions by weight unless otherwise specified.

EXAMPLES

Example 1

Polymer Synthesis and Characterization

Materials

Poly(N-vinylformamide) was obtained from Dia-Nitrix Co., Ltd. Polyvinylamine was obtained as LUPAMIN® 9030 from BASF Corp. BASF LUPAMIN® products have a pH value between 8 and 9. Post refining old corrugated container (OCC) pulp suspension and tray white water were obtained from National Gypsum Company (Pryor, Okla. USA) ("OCC pulp 1"), and also Durango McKinley Paper Company (New Mexico USA)("OCC pulp 2"). The National Gypsum Company pulp ("OCC pulp 1") had a consistency of 4.7%, and the Durango McKinley pulp ("OCC pulp 2") had a consistency of 5.2%. BUFLOC® 5511 was a commercial cationic polyacrylamide from Buckman Laboratories and had a molecular weight of around 10 M Da. BUFLOC® 5511 was diluted with de-ionized water to 0.125% and stirred gently for two hours before usage. Analytical grade NaNO$_3$ (>99.0%) was purchased from Sigma-Aldrich. A standard gel permeation chromatography calibration kit was obtained from Scientific Polymer Products, Inc. and contained a set of polyethylene oxide samples with narrow molecular weight distribution.

PNVF Hydrolysis

A series of samples 1-6 of poly(N-vinylformamide) (PNVF) were partially hydrolyzed under acidic conditions, and the resulting polymer was neutralized to pH=2.8-3.0. In each experiment, HCl solution (37.5% HCl) and de-ionized water were added to a three-necked 250 mL flask, and each resulting solution was heated to a selected temperature. 9.20 g dry PNVF sample was then introduced to the flask under shearing to give a 12 wt % PNVF solution. The reaction was maintained at the selected temperature for three hours. HCl concentration and reaction temperature were adjusted for each samples 1-6 of this experiment, and are given in Table 1. At the end of the reaction, solution pH was adjusted to 2.8-3.0 using 15% NaOH solution and the final product was stored at 4° C. until further usage. Molecular weight and compositional analysis of the polymer products were conducted for one or more of the samples 1-6 and LUPAMIN® 9030, as follows.

Molecular Weight Measurements

The molecular weights of PNVF of Sample 1 and LUPAMIN® 9030 were determined using a Waters Breeze Gel Permeation Chromatography (GPC) equipped with a Waters 1515 HPLC pump, a Waters 717plus auto-sampler, a Waters 2414 refractive index detector, and a Waters Ultrahydrogel Linear column. In a typical experiment, flow rate was set at 0.9 mL/min and column temperature was set at 30° C. 1 M $NaNO_3$ filtered using Pall VacuCap 90 Filter Unit was used as the mobile phase to carry a polymer sample through the column. At the end of data collection, polymer molecular weight distribution was calculated based on a calibration curve pre-determined using the standard GPC calibration kit. PNVF of Sample 1 had a weight average molecular weight of 410 k Da and a polydispersity of 5.1. LUPAMIN® 9030 had a weight average molecular weight of 350 k Da and a polydispersity of 5.4.

Nuclear Magnetic Resonance (NMR)

C13 NMR was applied to study the polymer products. The compositions of PVAm samples were studied by carbon 13 NMR using a Bruker AV 400 NMR spectrometer. The data acquisition temperature was 30° C. The number of scans was set at 2048, and the relaxation time (D1) was 4 seconds. The acquired raw data was processed using Topspin 1.3 software. shows NMR spectra of Sample 1 which was hydrolyzed with 2.10% HCl under 80° C. Signal assignment is also given in. The signal at around 165 ppm was assigned to the aldehyde carbon atom "g" of NVF and the signal at around 150 ppm was assigned to the carbon atom "h" in amidine rings. The signals at lower frequencies from 25 to 55 ppm were assigned to various polymer backbone carbon atoms. The mole contents of NVF $r_{NVF}$, VAm $r_{VAm}$, and amidine $r_{amidine}$ were calculated based on the integrations under the signals, and the results for samples 1-6 and LUPAMIN® 9030 are summarized in Table 2.

In particular, $r_{NVF}$, $r_{VAm}$, and $r_{amidine}$ were calculated as:

$$r_{NVF} = \frac{2 \times a_{165\,ppm}}{a_{25-55\,ppm}} \quad (1)$$

$$r_{amidine} = \frac{4 \times a_{150\,ppm}}{a_{25-55\,ppm}} \quad (2)$$

$$r_{VAm} = 1 - r_{NVF} - r_{amidine} \quad (3)$$

where $a_{165\,ppm}$ is the integration under 165 ppm signal, $a_{150\,ppm}$ is the integration under signal 150 ppm, and $a_{25-55\,ppm}$ is the integration under all the signals within 25-55 ppm range. The amidine content was defined as the mole percentage of both NVF and VAm units that have reacted to form amidine.

TABLE 1

Effects of reaction temperature and HCl concentration on PVAm hydrolysis degree and amidine content.

| | Hydrolysis HCl concentration | Hydrolysis temperature (° C.) | Hydrolysis degree (mole %) | NVF content (mole %) | VAm content (mole %) | Amidine content* (mole %) |
|---|---|---|---|---|---|---|
| Lupamin 9030 | N/A | N/A | 33% | 37 | 3 | 60 |
| Sample 1 | 2.10% | 80 | 33 | 64 | 30 | 6 |
| Sample 2 | 2.10% | 85 | 41 | 54 | 36 | 10 |
| Sample 3 | 2.10% | 96 | 41 | 44 | 26 | 30 |
| Sample 4 | 1.30% | 85 | 25 | 71 | 21 | 8 |
| Sample 5 | 3.68% | 85 | 56 | 38 | 50 | 12 |
| Sample 6 | 6.30% | 85 | 88 | 7 | 83 | 10 |

The effects of hydrolysis conditions on amidine content on the PVAm products are shown by the results in Table 1. As shown by the data in Table 1, amidine formation proceeded to a greater extent at higher temperatures when other hydrolysis conditions were fixed. Changing temperature from 80° C. to 96° C. increased the amidine content from 6 mole % to 30 mole %. Thus, excessive amidine formation occurs during a hydrolysis reaction under high temperature such as 96° C. and can be prevented by carrying out the reaction at lower temperatures such as 85° C. for a short period of time (three hours and less). Also, a lower hydrolysis degree was observed when using lower HCl concentration, all other conditions equal.

Example 2

PVAm Storage Tests

The effects of storage pH and storage temperature on PVAm amidine formation were studied on Samples 1 and 2, which were prepared as described in Example 1. Compositional analyses of the samples was performed in the same manner as described in Example 1, at different time periods. The results are given in Table 2.

TABLE 2

Effects of storage pH and temperature on PVAm amidine formation.

| Name | pH | Storage temperature (° C.) | Storage Time (day) | Hydrolysis degree (mole %) | NVF content (mole %) | VAm content (mole %) | Amidine content* (mole %) |
|---|---|---|---|---|---|---|---|
| Sample 1 (Fresh) | 2.8 | N/A | N/A | 33 | 64 | 30 | 6 |
| Sample 1 | 2.8 | 25 | 30 | 33 | 62 | 28 | 10 |
| Sample 1 | 2.8 | 50 | 4 | 33 | 60 | 26 | 14 |
| Sample 1 | 2.8 | 50 | 18 | 33 | — | — | 24 |
| Sample 1 | 6.8 | 25 | 30 | 33 | 44 | 10 | 46 |
| Sample 1 | 6.8 | 50 | 4 | 33 | 36 | 2 | 62 |
| Sample 2 | 3.0 | 25 | 1 | 41 | 54 | 36 | 10 |
| Sample 2 | 9.0 | 25 | 1 | 41 | 46 | 28 | 26 |

As shown by the results in Table 2, both storage pH and storage temperature greatly affected amidine formation in Sample 1. The freshly prepared Sample 1 contained mostly vinylamine (64 mole %) and N-vinylformamide (30 mole %) at pH=2.8. The amidine content was only around 6 mole %. After 30 days at 25° C., Sample 1 did not show significant change in amidine content. However, when Sample 1 was stored at pH=6.8 and 25° C. for 30 days, the amidine content increased to 46 mole %. Higher temperature accelerated amidine formation at both pH=2.8 and pH=6.8. After only four days at 50° C., the amidine content increased to 14 mole % at pH=2.8 and 62% at pH=6.8. Furthermore, the amidine content increased rather rapidly at 25° C. when the product pH value was increased to 9.0.

Figure 1:
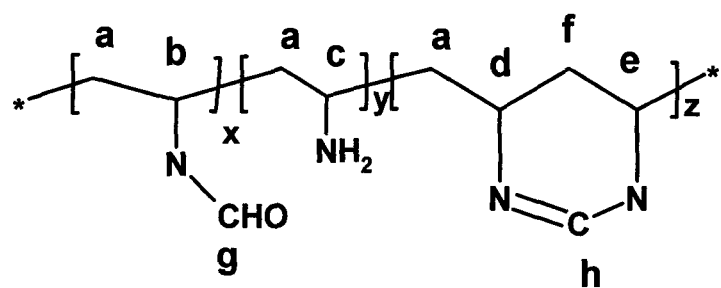
FIG. 1 shows NMR C13 spectra of a polyvinylamine polymer, i.e., PVAm sample 1, described in the examples included herein, which was stored at different pH and temperature conditions, and the spectral peaks and corresponding polymer structural moieties are indicated in the accompanying structure via identifiers a-g.
Figure 1:
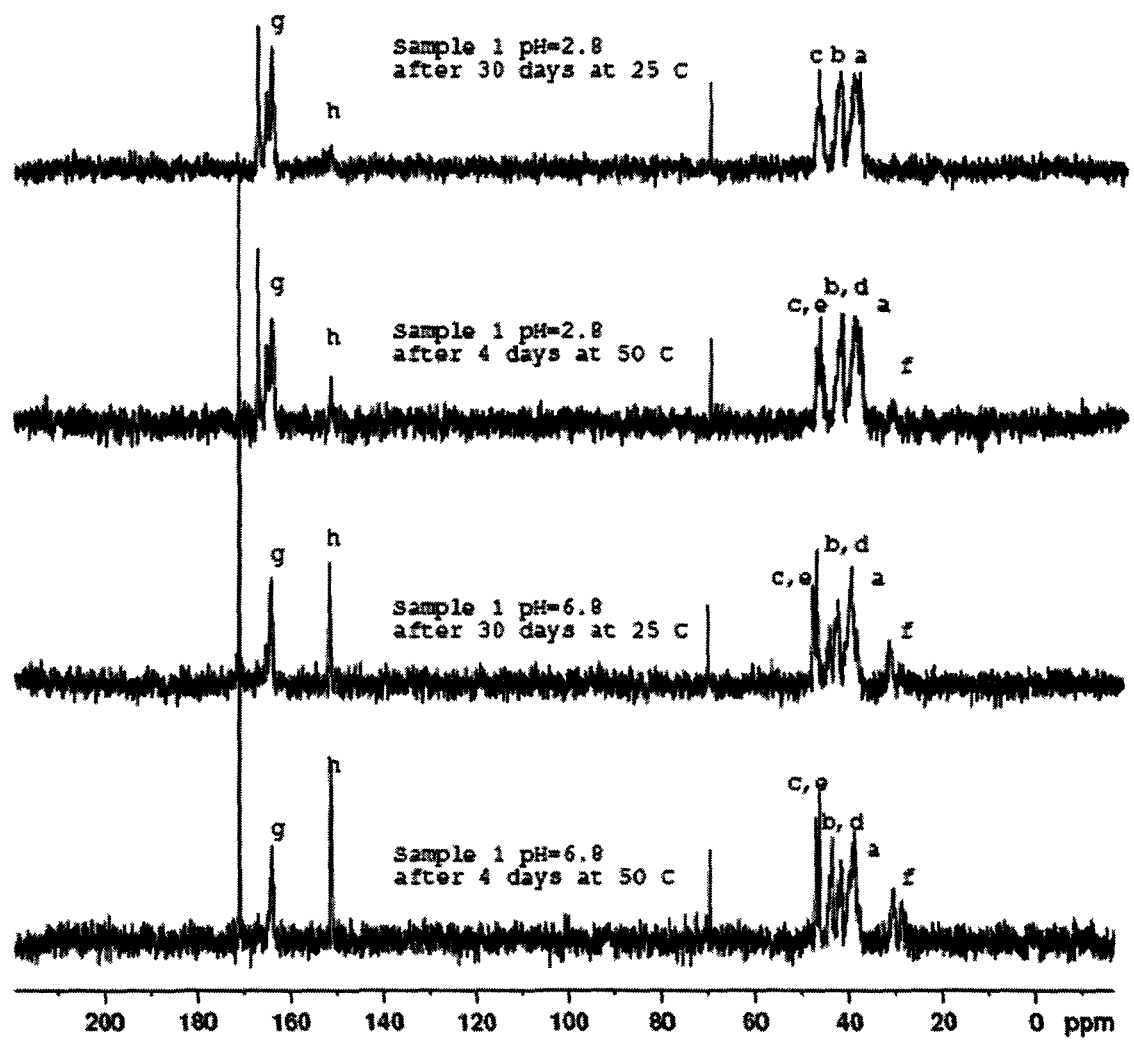
Figure 2:
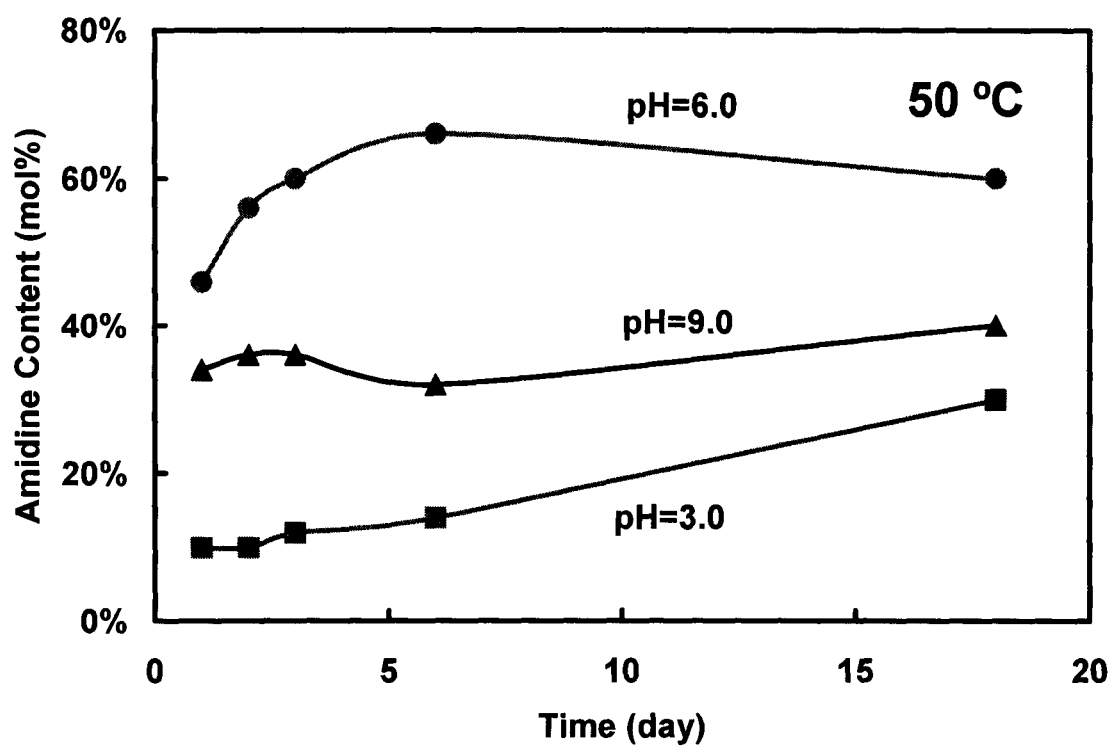
FIG. 2 is a plot showing the effect of storage pH on amidine formation on a polyvinylamine polymer, i.e., PVAm sample 2, described in examples included herein, where the amidine contents were determined based on C13 NMR spectra and the sample was stored at 50° C. over a monitored period of days.

Sample 2 was hydrolyzed with 2.10% HCl under 80° C. When stored for only 1 day with pH=9.0 at 25° C., the amidine content of Sample 2 increased remarkably from 10% to 26%. Sample 2 amidine content also was monitored at three different pH values (3.0, 6.0, and 9.0) at 50° C. and FIG. 2 shows the results. At pH=3.0, amidine formation is slowest and there was no significant increase in amidine content for 6 days. After 18 days, the amidine content only increased to 30 mole %. Amidine formation rate on PVAm was significantly slowed down by storing PVAm under acidic pH around 3.0. The fastest amidine formation rate was observed at pH=6.0 and the amidine content reached 66 mole % in only 6 days.

These results show that during storage, vinylamine and N-vinylformamide reacted to form amidine units, especially at certain pH conditions. Increasing storage temperature from 25° C. to 50° C. increased amidine formation rate. At 25° C., no significant amidine content increase was observed in one month. At 50° C., 41% hydrolyzed PVAm increased its amidine content from 10 mole % to 24 mole % in 18 days.

Example 3

Paper Retention/Drainage Tests

The impact of PVAm samples on papermaking retention/drainage was studied using two different sources of old corrugated container (OCC) pulp. One OCC pulp was obtained from National Gypsum Company ("OCC pulp 1"), and the other OCC pulp was obtained from Durango McKinley ("OCC pulp 2").

Three PVAm samples having the properties indicated in Table 3 were used to study the effect of amidine content on retention/drainage properties. All three samples were prepared from Sample 1, as described in Example 1, and stored at 25° C. for 30 days. Sample 1-a had a pH value of 2.8 and an amidine content of 10 mole %. Sample 1-b had a pH value of 6.8 and an amidine content of 42 mole %. Sample 1-c was obtained by lowering Sample 1-b pH to 2.8 just before retention/drainage tests and its amidine content remained the same as Sample 1-b. The objective of Sample 1-c was to understand the effect of sample pH on retention/drainage. In this study, PVAm samples were used in combination with a high molecular weight (10 million Da) cationic polyacrylamide BUFLOC® 5511 to simulate the retention/drainage program in many papermaking mills.

TABLE 3

PVAm Samples used to study the effect of amidine content on PVAm retention/drainage performance.

| Name | Storage temperature (° C.) | Storage pH | Storage time (day) | Amidine content (mole %) | Note |
|---|---|---|---|---|---|
| Sample 1-a | 25 | 2.8 | 30 | 10 | — |
| Sample 1-b | 25 | 6.8 | 30 | 46 | — |
| Sample 1-c | 25 | 6.8 | 30 | 46 | pH was lowered to 2.8 right before usage |

Pulp first pass retention was measured for both treated pulps, OCC pulp 1 and OCC pulp 2, using a BTG DFR 04 retention system equipped with a RET 20 lab sensor. Before each test, concentrated OCC pulp suspension was diluted with the white water from the same mill to give a final consistency of 1.0%. The RET 20 lab sensor was calibrated using the dilute pulp suspension. During a typical first pass retention test, 1000 mL dilute pulp suspension was added to the tester and sheared under 950 rpm. BUFLOC® 5511 solution was then added in one injection and the pulp suspension was sheared for five seconds. Then PVAm solution was introduced and the pulp suspension was sheared at 650 rpm for five seconds before being filtered through a 60 mesh screen. First pass retention was calculated based on filtrate solid content determined by the RET 20 lab sensor. Drainage tests were carried out using a BTG DFR 04 drainage system equipped with a 60 mesh screen. During a typical drainage test, 1000 mL dilute pulp suspension was added to the tester under 950 rpm shearing. BUFLOC® 5511 solution was then added in one injection and the pulp suspension was sheared for five seconds. Then PVAm solution was introduced and the pulp suspension was sheared at 650 rpm for five seconds before being filtered through a 60 mesh screen. The weight of the collected filtrate as a function of filtering time was recorded. For a fixed filtrate weight, a shorter filtering time indicates a faster drainage rate. The turbidity of the collected filtrate was also determined using a HACH 2100 turbidimeter and used a second indication of first pass retention. Tables 4 and 5 show the effect of use of samples having different amidine content on retention/drainage on two different pulps. Control experiments were carried out by adding only BUFLOC®5511. The results for OCC pulps 1 and 2 are shown in Tables 4 and 5.

TABLE 4

Drainage and first pass retention tests using OCC pulp 1 at room temperature.

| Test | 500 mL drainage time (sec) | Filtrate turbidity (ntu) | First Pass Retention |
|---|---|---|---|
| 0.4 lb/ton Bufloc 5511 | 37.8 | 524 | 77.5% |
| 0.6 lb/ton Bufloc 5511 | N/A | N/A | 79.3% |
| 1.0 lb/ton Bufloc 5511 | N/A | N/A | 79.5% |
| 0.4 lb/ton Bufloc 5511 + 4 lb/ton Sample 1-a | 26.8 | 175 | 83.5% |
| 0.4 lb/ton Bufloc 5511 + 4 lb/ton Sample 1-b | 31.0 | 210 | 81.8% |
| 0.4 lb/ton Bufloc 5511 + 4 lb/ton Sample 1-c | 31.5 | 208 | 81.3% |
| 0.4 lb/ton Bufloc 5511 + 3 lb/ton Sample 1-a | 32.7 | 249 | N/A |
| 0.4 lb/ton Bufloc 5511 + 3 lb/ton Sample 1-b | 34.9 | 304 | N/A |
| 0.4 lb/ton Bufloc 5511 + 3 lb/ton Sample 1-c | 35.9 | 295 | N/A |

TABLE 5

Drainage and first pass retention tests using OCC pulp 2 at room temperature.

| Test | 600 mL drainage time (sec) | Filtrate turbindity (ntu) | First pass retention |
|---|---|---|---|
| 0.4 lb/ton Bufloc 5511 | 35.7 | 190 | 84.5% |
| 0.4 lb/ton Bufloc 5511 + 4 lb/ton Sample 4 (25% hydrolyzed) | 32.8 | 130 | 85.1% |
| 0.4 lb/ton Bufloc 5511 + 4 lb/ton Sample 1-a (33% hydrolyzed) | 28.0 | 126 | 88.6% |
| 0.4 lb/ton Bufloc 5511 + 4 lb/ton Sample 1-b (33% hydrolyzed) | 30.7 | 131 | 87.7% |
| 0.4 lb/ton Bufloc 5511 + 4 lb/ton Sample 5 (56% hydrolyzed) | 28.2 | 151 | 87.6% |
| 0.4 lb/ton Bufloc 5511 + 4 lb/ton Sample 6 (88% hydrolyzed) | 34.7 | 186 | 86.9% |

As shown by the results in Table 4, at around 0.6 lb/ton BUFLOC® 5511, first pass retention reached a plateau of 79.3%. Increasing the BUFLOC® 5511 dosage to 1.0 lb/ton only did not give significant retention improvement. Upon the addition of 4.0 lb/ton Sample 1-a in combination with 0.4 lb/ton BUFLOC® 5511, first pass retention increased considerably from 77.5% to 83.5% and the drainage time of 600 mL filtrate also decreased from 37.8 seconds to 26.8 seconds. In contrast, both Sample 1-b and Sample 1-c gave significantly lower retention and drainage rate. At 4.0 lb/ton, Sample 1-b gave 81.8% of first pass retention and 31.0 seconds of drainage time and Sample 1-c gave 81.3% of first pass retention and 31.5 seconds of drainage time. This result demonstrates clearly that lower amidine content results in higher first pass retention and drainage rate. The above three samples were also compared at a lower addition dosage of 3.0 lb/ton and the same trend was observed.

As shown in the data in Table 5, 4.0 lb/ton Sample 1-a decreased 600 mL filtrate drainage time from 35.7 seconds to 28.0 seconds and increased first pass retention from 84.5% to 88.6%. Whereas, the same amount of Sample 1-b only decreased drainage time to 30.7 seconds and increased retention to 87.7%. Sample 1-a with less amidine content consistently gave better retention/drainage performance than Sample 1-b with higher amidine content when tested using OCC pulp 2. Data in Table 5 also shows the effect of hydrolysis degree on retention/drainage. Sample 1-a with an intermediate hydrolysis degree of 33% provided the best performance.

Example 4

Paper Dry Strength Tests

The effects of PVAm products having varied amidine content on the dry strength properties of hand sheets made from OCC pulp 2 was studied.

All hand sheets were prepared essentially according to Tappi standard method T205 with the following modifications. (1) 1 wt % PVAm solution was added to 0.5 wt % Durango Mckinley pulp suspension (OCC pulp 2), diluted with tap water, under shearing. (2) Five three-gram hand sheets were prepared in a standard Handsheet mould. (3) After two wet presses, the hand sheets were dried for 15 minutes in an Emerson Speed Drier (Model 130) at 105° C. 4 kg weight was kept on the drier during the drying process. (4) The obtained hand sheets were conditioned in a constant humidity room (50% humidity, 23° C.) for 15 hours before testing. The PVAm dosage was 4.0 lb polymer/ ton dry fiber. Dry tensile breaking strength tests, burst strength tests, and ring crush strength tests were carried out based on Tappi standard methods T494, T403, and T822 respectively. The results are set forth in Table 6. The reported tensile index was the average of 10 repeats. The reported burst strength was also the average of 10 repeats. The reported ring crush strength was the average of five repeats.

TABLE 6

Dry strength properties of OCC 2 hand sheets treated with 4.0 lb/ton PVAm.

| Name | Tensile index (N m/g) | Tensile index change | Burst strength (psi) | Burst strength change | Ring crush strength (lb/in) | Ring crush strength change |
|---|---|---|---|---|---|---|
| Blank | 40.9 ± 1.3 | 0 | 55.5 ± 2.0 | 0 | 59.7 ± 3.6 | 0 |
| Sample 1-a | 47.6 ± 1.4 | 16.3% | 65.9 ± 3.4 | 18.7% | 75.8 ± 2.4 | 27.0% |
| Sample 1-b | 45.3 ± 0.9 | 10.7% | 64.0 ± 2.4 | 15.2% | 73.8 ± 1.5 | 25.2% |
| Sample 5 | 44.8 ± 1.7 | 9.5% | 63.6 ± 2.3 | 14.6% | 70.8 ± 2.1 | 18.6% |
| Lupamin 9030 | 44.7 ± 1.5 | 9.4% | 62.7 ± 4.3 | 12.8% | 72.4 ± 1.4 | 21.2% |

In this experimental, three samples were compared with different amidine content but the same hydrolysis degree. As shown above, Sample 1-a and Sample 1-b contained 10 mole % and 46 mole % amidine. LUPAMIN® 9030 was also a 33% hydrolyzed product from BASF. It had an amidine content of 60 mole %. As indicated, OCC pulp 2 was used to prepare hand sheets and three types of Handsheet dry strength properties (tensile index, burst strength, and ring crush strength) were measured. These strength properties are commonly desired by papermakers. As shown in Table 6, Sample 1-a with the least amount of amidine provided the most tensile index enhancement of 16.3%, whereas LUPAMIN® 9030 with the most amidine content provided the least tensile enhancement of 9.4%. This amidine content effect on tensile index was also consistent with the other two strength properties. In addition, the enhancement of tensile index and burst strength from LUPAMIN® 9030 was even as low as Sample 5 which had a 56% hydrolysis degree but a low amidine content of 12 mole %. This result clearly demonstrates that the PVAm products with lower amidine content provide paper with higher dry strength.

In practice, there often is generally from several weeks to several months between the date that PVAm products are synthesized and the date that they are applied on the paper machine. As a result, conventional commercial PVAm products, even those with intermediate hydrolysis degrees, contain large amount of amidine units. For example, LUPAMIN® 9030 used in the above experiments contained about 60 mole % amidine. The results of these experiments demonstrate clearly that lower amidine content in PVAm polymer products, such as those provided in accordance with the present teachings, improves retention, drainage, and dry strength enhancing performances significantly as compared to PVAm polymer having higher amidine content.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

It will be apparent to those skilled in the art that various modifications and variations can be made to the embodiments of the present invention without departing from the spirit or scope of the present invention. Thus, it is intended that the present invention covers other modifications and variations of this invention provided they come within the scope of the appended claims and their equivalents.

What is claimed is:

1. A polymer comprising units of homopolymerizing N-vinylformamide, vinyl amine, and the amidine, wherein the polymer has an age of at least 21 days under conditions of a pH of no greater than about 6 and a temperature of no greater than about 55° C. and an amidine content no greater than about 15 mole % and a vinyl amine content of from 5 mole % to 49 mole %.

2. The polymer of claim 1, wherein the polymer having a degree of hydrolysis of no more than about 57%.

3. The polymer of claim 1, wherein the polymer has an amidine content in the range of about 0.1 to about 12 mole %.

4. The polymer of claim 1, wherein the polymer has a degree of hydrolysis of about 25% to about 57%.

5. The polymer of claim 1, wherein the polymer has a degree of hydrolysis of about 30% to about 57%.

6. The polymer of claim 1 having the structure (I):

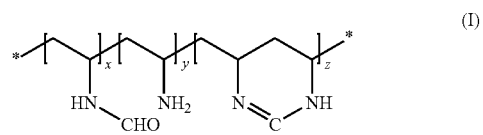

wherein z/(y+z)<90% when x≧y or z/(x+z)<90% when x<y.

7. The polymer of claim 1 having the structure (I):

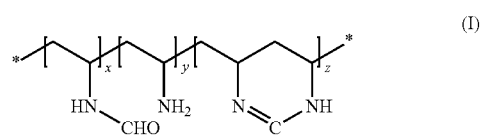

wherein x is 50 to 90 mole percent of said polymer, y is 49 to 5 mole percent of said polymer, and z is 0 to 15 mole percent of said polymer.

8. The polymer of claim 1, wherein the polymer is a terpolymer of randomly linked units of homopolymerized N-vinylformamide, vinyl amine, and amidine.

9. A polymer comprising units of homopolymerized N-vinylformamide, vinyl amine, and amidine, wherein the polymer has a degree of hydrolysis of no more than about 57%, and wherein the polymer has an amidine content of from about 0.1 to about 15 mole %, a vinyl amine content of from 49 to 5 mole %, and homopolymerized N-vinylformamide content of from 50 to 90 mole %.

10. The polymer of claim 9, wherein the polymer has an amidine content of from about 0.1 to about 12 mole %.

11. The polymer of claim 9, wherein the polymer has an amidine content in the range of about 0.1 to about 10 mole %.

12. The polymer of claim 9, wherein the polymer has a degree of hydrolysis of about 25% to about 57%.

13. The polymer of claim 9, wherein the polymer has a degree of hydrolysis of about 30% to about 57%.

14. The polymer of claim 9 having the structure (I):

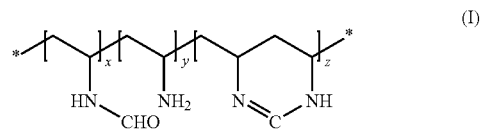

wherein z/(y+z)<90% when x≧y or z/(x+z)<90% when x<y.

15. A process for providing vinylamine polymer having low amidine content, comprising:
   (a) homopolymerizing N-vinylformamide to form poly(N-vinylformamide) homopolymer, and
   (b) partially hydrolyzing the poly(N-vinylformamide) homopolymer formed in step (a) under acidic aqueous conditions at a temperature no greater than about 85° C. and for a period of time of no greater than about 4 hours to provide a polymer comprising units of homopolymerized N-vinylformamide, vinyl amine, and amidine, wherein the amidine content is no greater than about 15 mole % and the polymer having a degree of hydrolysis of no more than about 57%.

16. The process of claim 15, further comprising a step (c), said step (c) comprises maintaining the polymer provided in step (b) under conditions of a pH of no greater than about 6 and a temperature of no greater than about 55° C. for at least about 21 days after completing step (b), wherein the amidine content of said polymer being no greater than about 25 mole % after being maintained for 21 days under said conditions.

17. The process of claim 15, further comprising a step (c), said step (c) comprising maintaining the polymer provided in step (b) under conditions of a pH of no greater than about 3.5 and a temperature of no greater than about 30° C. for at least about 30 days after completing step (b), wherein the amidine content of said polymer being no greater than about 12 mole % after being maintained for 30 days under said conditions.

18. The polymer of claim 1, wherein the polymer has an amidine content of from about 0.1 to about 15 mole %, a vinyl amine content of from 49 to 5 mole %, and an N-vinylformamide content of from 50 to 90 mole %.

* * * * *